United States Patent
Itoh et al.

(10) Patent No.: US 6,942,594 B2
(45) Date of Patent: Sep. 13, 2005

(54) AUTOMATIC STOP/START CONTROLLER FOR AN ENGINE

(75) Inventors: Yoshiki Itoh, Shizuoka-ken (JP); Tatsuji Mori, Shizuoka-ken (JP); Norihiro Noda, Shizuoka-ken (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 6 days.

(21) Appl. No.: 10/761,177

(22) Filed: Jan. 20, 2004

(65) Prior Publication Data

US 2004/0153236 A1 Aug. 5, 2004

(30) Foreign Application Priority Data

Jan. 21, 2003 (JP) ...................... 2003-012124

(51) Int. Cl.$^7$ ................................ B60K 1/02
(52) U.S. Cl. ......................... 477/3; 477/107
(58) Field of Search ............... 477/3, 99, 107

(56) References Cited

U.S. PATENT DOCUMENTS 5,685,800 A * 11/1997 Toukura ...................... 477/90
6,190,284 B1 * 2/2001 Kuroda et al. .............. 477/107

FOREIGN PATENT DOCUMENTS

JP 2002-106380 10/2002

* cited by examiner

*Primary Examiner*—Dirk Wright
(74) *Attorney, Agent, or Firm*—Flynn, Thiel, Boutell & Tanis, P.C.

(57) ABSTRACT

An automatic stop/start controller for a vehicle having an engine, an electric motor to drive the engine, and an automatic transmission. The automatic stop/start controller permits the engine to stop or start without operation of an ignition key. The controller starts fuel supply to the engine after the engine is started by the electric motor and when it is determined that frictional engaging elements of the automatic transmission are engaged, in a case where the engine is started without the operation of the ignition key.

10 Claims, 3 Drawing Sheets

AUTOMATIC STOP/START CONTROLLER FOR AN ENGINE

CROSS REFERENCE TO RELATED APPLICATIONS

This application is related to the following copending applications: (1) Ser. No. 10/761,178 filed Jan. 20, 2004, and titled "AUTOMATIC STOP/START CONTROLLER FOR ENGINE"; (2) Ser. No. 10/761,179 filed Jan. 20, 2004, and titled "AUTOMATIC STOP/START CONTROLLER FOR ENGINE"; and (3) Ser. No. 10/761,176 filed Jan. 20, 2004, and titled "AUTOMATIC STOP/START CONTROLLER FOR ENGINE", the entire disclosures of which are herein incorporated by reference.

FIELD OF THE INVENTION

This invention relates to a start controller for a vehicle to permit an engine to automatically stop and restart, and more particularly to an automatic stop/start controller for the engine, without an electrically powered pump that generates oil pressure for an automatic transmission at engine stop. This automatic stop/start controller controls the engine to start while reducing shock resulting from the engine at automatic restart.

BACKGROUND OF THE INVENTION

Some vehicles are provided with automatic stop/start controllers so as to reduce fuel consumption by the vehicles' engines. The automatic stop/start controller automatically stops the engine when an automatic stop condition, e.g., an accelerator pedal is not depressed while the engine is operating, is satisfied, and automatically starts the engine when an automatic start condition, e.g., the start operation occurs while the engine is automatically stopped, is satisfied. (See JP Laid-Open No. 2002-106380.)

As regards a conventional automatic stop/start controller for the engine, it is present in the vehicle to permit the engine to automatically stop and restart to enhance fuel economy.

In a conventional vehicle provided with an automatic transmission, an electrically-powered pump generates an oil pressure while the engine is automatically stopped, and is controlled to maintain low pressure during automatic engine stop and high pressure at engine restart. Thus, the required oil pressure is maintained while restricting electric power consumed by the electrical pump.

Although the power consumption is minimized to maintain low pressure during automatic engine stop, the electrical pump continuously consumes electric power during automatic engine stop. There is thus still room for improvement in fuel consumption.

If the electric pump is eliminated, the fuel economy is improved by eliminating the electric power consumed by the electric pump. However, the oil pressure cannot be maintained during the automatic engine stop, so that the oil pressure is then generated at engine restart and delays occur until frictional engaging elements in the automatic transmission are engaged.

As a result, if the accelerator pedal is depressed before the frictional engaging elements are engaged, the engaging elements will be engaged after the engine speed is increased sharply. This causes shock at engagement of the elements, or deteriorates the durability of the automatic transmission.

SUMMARY OF THE INVENTION

In order to obviate or minimize the above-mentioned inconveniences, the present invention provides an automatic stop/start controller for a vehicle having an engine, an electric motor to drive the engine, and an automatic transmission. The automatic stop/start controller permits the engine to stop or start without operation of an ignition key. The controller, in a situation where the engine is started without the operation of the ignition key, starts fuel supply to the engine after the engine is started by the electric motor and when (after) it is determined that frictional engaging elements of the automatic transmission are engaged.

According to the present invention, at restart of the engine without the operation of the ignition key, the fuel is supplied to the engine after it is determined that the frictional engaging elements of the automatic transmission are engaged. Even without an electric pump for oil pressure generation to control the automatic transmission, the present invention not only reduces fuel consumption and shock at restart of the engine, but also improves the durability of the automatic transmission.

BRIEF DESCRIPTION OF THE DRAWINGS

The present invention is described in specific detail as follows with reference to the Figures wherein.

DETAILED DESCRIPTION

FIGS. 1–5 illustrate an embodiment of the present invention.

Figure 2:
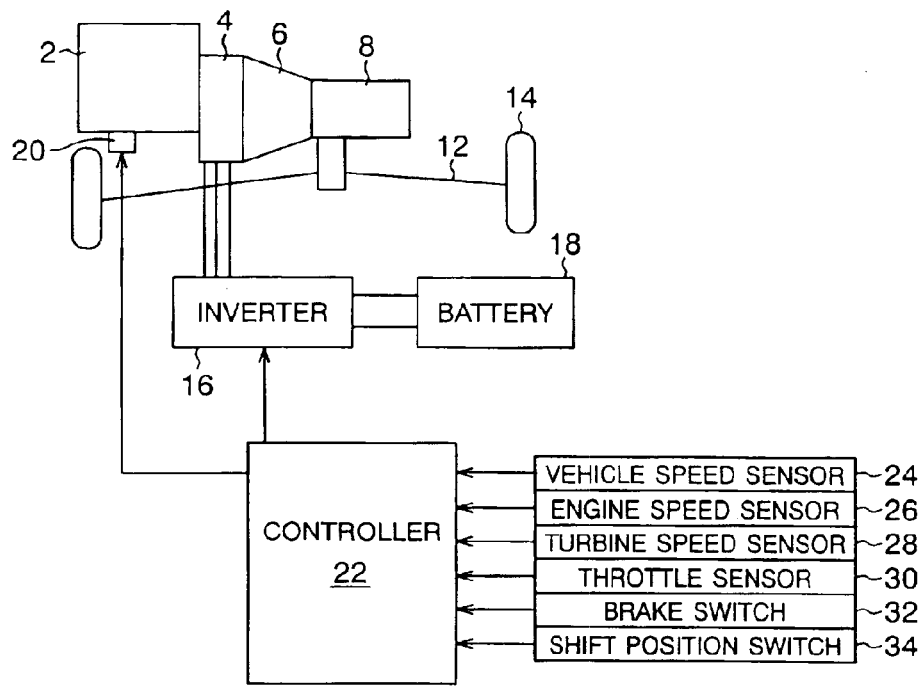
FIG. 2 is a schematic diagram showing the automatic stop/start controller for the engine.

FIG. 2 shows an internal combustion engine 2 mounted on, e.g., a hybrid vehicle (not shown). The engine 2 is controlled by an automatic stop/start controller so as to be stopped or started without operation of an ignition key (not shown).

The engine 2 on the hybrid vehicle (not shown) is directly connected to an electric motor (hereinafter referred to as "motor"). The motor 4 is connected to an automatic transmission 8 equipped with a torque converter 6.

The motor 4 can drive the engine 2, and performs the functions of power generating and of assisting the engine at least during running of the vehicle.

The automatic transmission 8 is a conventional transmission that can change speeds by an oil pressure control.

The automatic transmission 8 is connected to a conventional differential 10 which is connected with driving wheels 14 through a driving shaft 12.

The motor 4 is connected to a battery 18 through an inverter 16, and the engine 2 is provided with a fuel injector 20.

Further, the inverter 16 and the fuel injector 20 are connected to a controller 22. The controller 22 is connected to various sensors and switches, i.e., a vehicle speed sensor 24 to detect the vehicle speed, an engine speed sensor 26 to detect engine speed, a turbine speed sensor to detect rotational speed of a turbine (not shown) of the torque converter 6, a throttle sensor 30 to detect opening degree of a throttle, a brake switch 32 to detect whether a brake pedal (not shown) is depressed, and a (not shown) shift lever position switch 34 to detect location of a transmission shift lever.

In the automatic stop/start controller for the engine, without an electric pump to generate the oil pressure in the automatic transmission 8 at engine stop, at start of the engine 2 without the ignition key operation, the controller 22 is configured to function to start supplying fuel to the engine 2 when a difference between the engine speed and the turbine rotational speed (turbine speed) of the automatic transmission 8 is greater than a predetermined "reference speed for engage determination" (i.e. a threshold for determination of the engagement) after the engine 2 is driven by the motor 4.

Also, the controller 22 performs the added function of decreasing the generated torque (motor torque) by the electric motor 4 when the elapsed time from the beginning of the fuel supply is longer than a predetermined "reference time to determine to start torque decrease".

Further, the controller 22 performs the additional function of determining, from the speed difference between input and output rotational speeds of the torque converter 6, whether the frictional engaging elements of the torque converter are engaged.

More particularly, in the automatic stop/start controller for the engine, without the electric pump to generate oil pressure for the automatic transmission 8 during the engine stop, the fuel supply to the engine 2 begins after it is determined, from the speed difference between the input and output rotational speeds of the torque converter 6, whether the frictional engaging elements of the automatic transmission 8 are engaged at automatic restart of the engine. Then the generated torque by the motor 4 is decreased after the fuel supply begins and the engine 2 can output torque.

Figure 3:
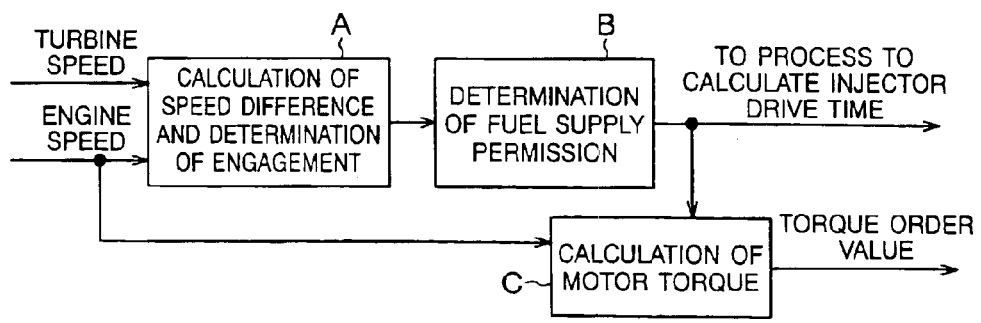
FIG. 3 is a block diagram showing control of a controller.
Figure 4:
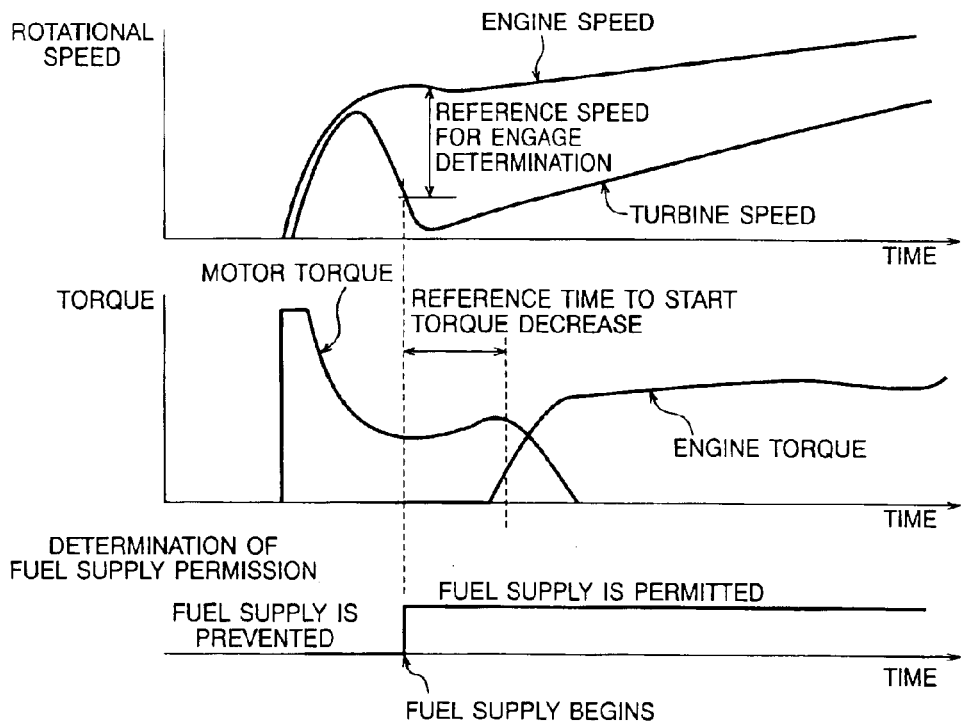
FIG. 4 is a timing chart for the automatic stop/start controller for the engine.

The control of the controller 22 is explained as follows with reference to FIG. 3.

At first, an engage determination process "A" calculates a speed difference and determines engagement. More particularly, the speed difference is calculated by subtracting the turbine speed from the engine speed, which turbine speed is detected by the turbine torque sensor 28 on the output side of the torque converter 6, and engine speed is detected by the engine speed sensor 26 on the input side of the torque converter 6. Also the engagement of the elements is determined by comparing the calculated speed difference with the predetermined reference speed for engage determination (see FIG. 4). Then, a process "B" is performed to determine whether the fuel is permitted to be supplied to the injector 20, followed by an injector drive time calculating process.

Figure 5:
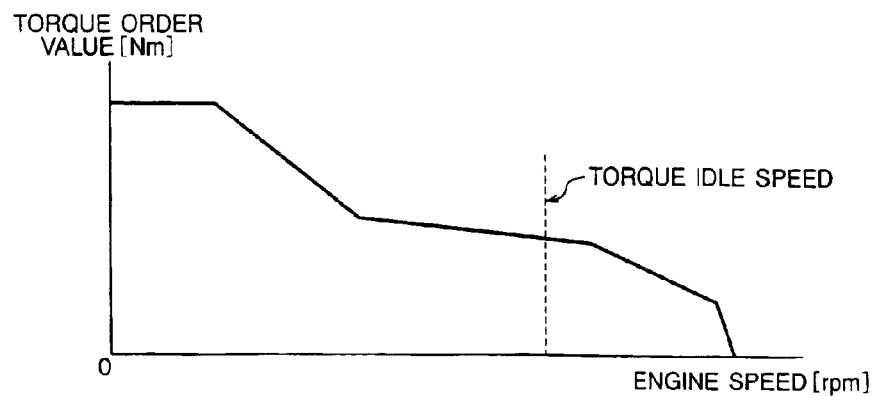
FIG. 5 is a table for calculating the motor torque.

According to the engine speed output from the engine speed sensor 26 and an output signal from the fuel supply permission determination process "B", a motor torque calculating process "C" is performed to calculate a torque order value by using a table for calculating motor torque as shown in FIG. 5.

Figure 1:
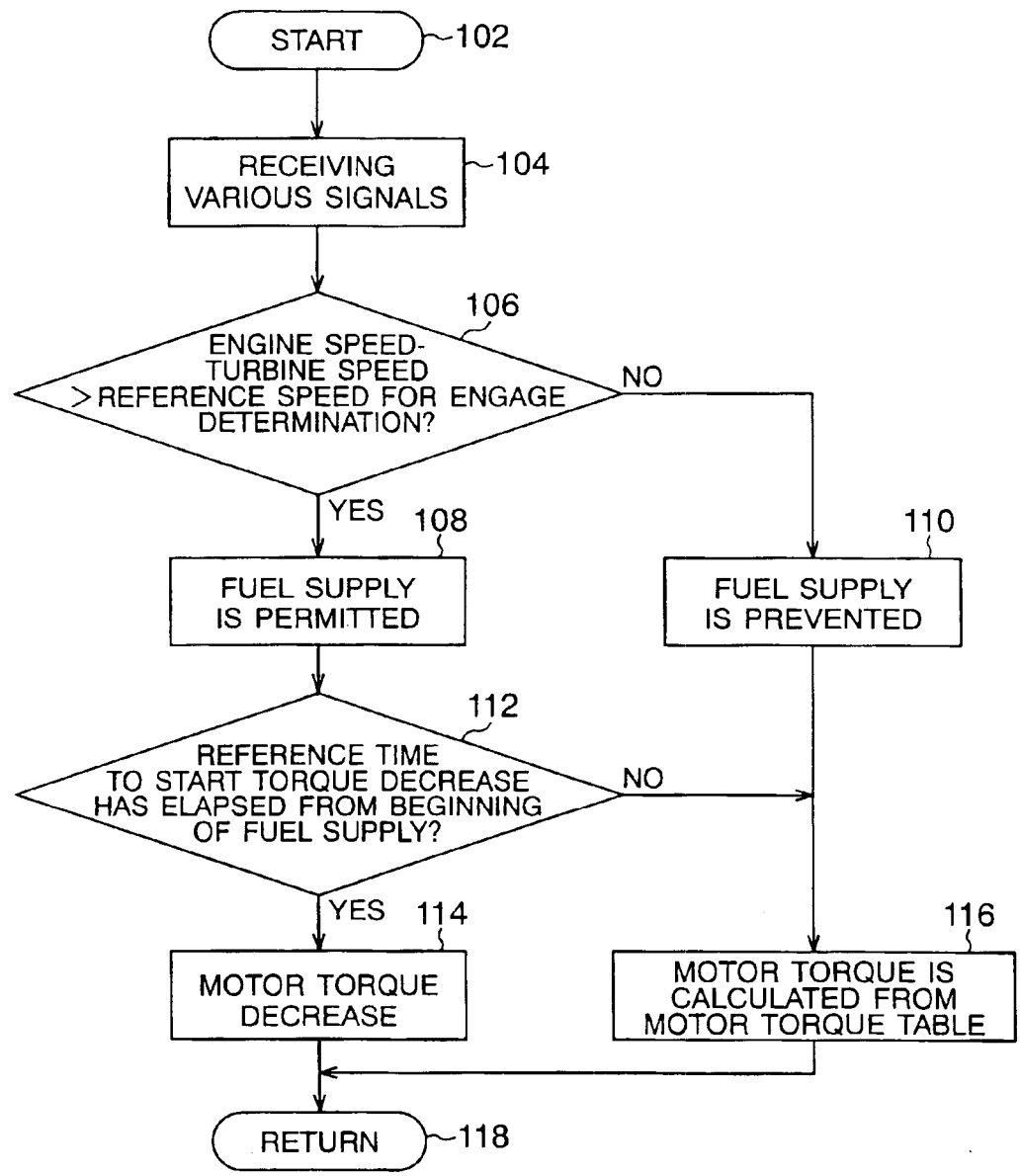
FIG. 1 is a flowchart showing a control of an automatic stop/start controller for an engine according to an embodiment of the present invention.

The operation of the embodiment of the invention is described as follows with reference to a control flowchart in FIG. 1 for use in the automatic stop/start controller for the vehicle engine.

When a program for the automatic stop/start controller 22 starts at step 102, it starts to receive the output signals from the various sensors such as the engine speed sensor 26 and the various switches such as the brake switch 32 at step 104.

By comparing the speed difference between the input and output rotational speeds of the torque converter 6 (i.e., the rotational speed difference calculated by subtracting the turbine speed from the engine speed) with the predetermined reference speed for engage determination, that is, by using the equation "engine speed−turbine rotational speed>the reference speed for engage determination", it is determined whether the speed difference is greater than the reference speed for engage determination at step 106.

If the determination at step 106 is "YES", then the fuel supply to the injector 20 is permitted. If the determination at step 106 is "NO", then the fuel supply to the injector 20 is prevented.

After the fuel supply to the injector 20 is permitted to begin at step 108, a determination is made at step 112 whether the elapsed time from the beginning of the fuel supply is longer than the reference time to start torque decrease, that is, whether the reference time to start torque decrease (see FIG. 4) has elapsed from the beginning of the fuel supply. If the determination at step 112 is "YES", then the motor torque is decreased (see FIG. 4) at step 114 and the program goes to a return process at step 118.

If the fuel supply to the injector 20 is prevented at step 110, or if the determination at step 112 is "NO", the motor torque is calculated at step 116 with reference to the table of FIG. 5, and the program goes to the return process at step 118.

Thereby, at restart of the engine without operation of the ignition key, the engine 2 is supplied with the fuel after it is determined that the frictional engaging elements of the automatic transmission 8 are engaged. This eliminates the electric pump for oil pressure generation to control the automatic transmission, which reduces not only the shock at restart of the engine and fuel consumption, and also improves the durability of the automatic transmission.

Also, the control means 22 performs the added function that decreases the generated torque (motor torque) by the electric motor 4 when the elapsed time from the beginning of the fuel supply is longer than the predetermined reference time to start torque decrease. This increases the engine torque smoothly at restart of the engine, which is advantageous in practical use.

Further, without an additional sensor, the engagement of the frictional engaging elements is determined by the speed difference between the input and output rotational speeds of the torque converter 6. This maintains the system simple and avoids cost increase, which is advantageous from an economical view point.

The present invention is not limited to the above-mentioned embodiment, but is adaptable for various applications and variations or modifications.

In the above-mentioned embodiment, the engagement of the frictional engaging elements is determined by the speed difference between the engine speed and the turbine rotational speed of the automatic transmission. However, other factor can be employed for this determination. That is, the engine speed can be estimated from the electric power by the battery, so that the electric power from the battery can be employed for the factor instead of the engine speed.

In addition, the precision of the determination of the engagement can be improved by considering the percentage of change in the turbine rotational speed close to the reference speed for engage determination.

As thus described, the present invention provides an automatic stop/start controller for a vehicle engine, an electric motor to drive the engine, and an automatic transmission. The automatic stop/start controller permits the engine to stop or start without operation of an ignition key.

The controller starts fuel supply to the engine after the engine is started by the electric motor and when it is determined that frictional engaging elements of the automatic transmission are engaged, in a case where the engine is started without the operation of the ignition key. Even without an electric pump for oil pressure generation to control the automatic transmission, the present invention reduces fuel consumption and shock at restart of the engine, and also improves the durability of the automatic transmission.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. An automatic stop/start controller for a vehicle engine having an electric motor to drive the engine, and an automatic transmission, said automatic stop/start controller permitting said engine to stop or start without operation of an ignition key, comprising: a controller to start fuel supply to said engine after said engine is started by said electric motor and when it is determined that frictional engaging elements of said automatic transmission are engaged, in a case where said engine is started without the operation of the ignition key.

2. The automatic stop/start controller for the engine as defined in claim 1, wherein said controller decreases the torque generated by said electric motor when the elapsed time from the beginning of the fuel supply is longer than a predetermined time.

3. The automatic stop/start controller for the engine as defined in claim 2, wherein said electric motor performs functions of power-generating and of assisting said engine at least when the vehicle is running.

4. The automatic stop/start controller for the engine as defined in claim 2, wherein said automatic transmission is a transmission that can change speeds by an oil pressure control.

5. The automatic stop/start controller for the engine as defined in claim 1, wherein said electeic motor performs functions of power-generating and of assisting said engine at least when the vehicle is running.

6. The automatic stop/start controller for the engine as defined in claim 1, wherein said automatic transmission is a transmission that can change speeds by an oil pressure control.

7. A hybrid vehicle, comprising:
an internal combustion engine;
an electric motor-generator drivingly connected to the engine to assist in driving of said engine when functioning as a motor;
an automatic change-speed transmission drivingly connecting said engine and said motor to said vehicle wheels, said transmission having a rotational turbine associated therewith and also having frictional engaging drive elements; and
an automatic stop/start controller for permitting starting and stopping of the engine without operation of an ignition key;
said controller starting the supply of fuel to said engine after said engine is started by said electric motor and when it has been determined that the frictional engaging drive elements of said automatic transmission are engaged.

8. A vehicle according to claim 7, wherein the controller functions to start supplying fuel to the engine when the engine speed is a predetermined speed difference greater than the rotational speed of the transmission turbine.

9. A vehicle according to claim 8, wherein the controller decreases the torque generated by the motor when the elapsed time from the beginning of fuel supply is greater than a predetermined reference time interval.

10. A process for controlling the startup of an internal combustion engine having a motor generator coupled thereto for assisting in driving said engine, and an automatic transmission drivingly coupled to the output of said engine and said motor, the transmission having a rotatable turbine wheel and having frictional drive engaging elements, and a controller for controlling said motor to permit starting and stopping of said engine without use of an ignition key, comprising the steps of:
energizing the motor to effect starting of said engine;
initiating restart of an automatically stopped engine without operation of an ignition key by first determining if the engine speed exceeds the transmission turbine speed by a predetermined reference amount;
when the engine speed exceeds the turbine speed by said predetermined reference amount, initiating the supply of fuel to the engine;
after initiation of fuel supplied to the engine, determining whether elapsed time from the beginning of fuel supply is greater than a predefined reference time; and
if the elapsed time exceeds said reference time, then decreasing the assist torque provided by the motor.

* * * * *